United States Patent [19]

Porter et al.

[11] Patent Number: 4,518,575

[45] Date of Patent: * May 21, 1985

[54] CATALYTIC FIBROUS CARBON

[75] Inventors: Randall A. Porter; Larry E. Reed, both of Bartlesville, Okla.

[73] Assignee: Phillips Petroleum Company, Bartlesville, Okla.

[*] Notice: The portion of the term of this patent subsequent to Mar. 6, 2001 has been disclaimed.

[21] Appl. No.: 562,790

[22] Filed: Dec. 19, 1983

Related U.S. Application Data

[62] Division of Ser. No. 343,642, Jan. 28, 1982, abandoned.

[51] Int. Cl.$^3$ ............................................. D01F 9/12
[52] U.S. Cl. ............................. 423/447.3; 423/453; 423/458; 423/454
[58] Field of Search ............. 423/453, 454, 458, 447.3

[56] References Cited

U.S. PATENT DOCUMENTS

| | | | |
|---|---|---|---|
| 1,868,921 | 7/1932 | Schmidt et al. | 423/453 |
| 1,882,813 | 10/1932 | Haag | 423/453 |
| 2,367,928 | 1/1945 | Clark | 423/453 |
| 3,056,659 | 10/1962 | Yarze et al. | 423/454 |
| 3,791,847 | 2/1974 | Araki et al. | 423/458 |
| 3,816,609 | 6/1974 | Hamner | 423/655 |
| 4,435,376 | 3/1984 | Porter et al. | 423/447.3 |

FOREIGN PATENT DOCUMENTS 1469930 4/1977 United Kingdom .

OTHER PUBLICATIONS

Baird, Fryer, & Grant, "Carbon Formation on Iron and Nickel Foils by Hydrocarbon Pyrolysis—Reactions at 700° C.", *Carbon*, vol. 12 (1974) pp. 591–602.

"Structure of the Carbon Deposited from Carbon Monoxide on Iron, Cobalt and Nickel," *Journal of Physical Chemistry*, vol. 59 (Nov. 1955) pp. 1153–1155.

*Primary Examiner*—William R. Dixon, Jr.
*Assistant Examiner*—Steven Capella
*Attorney, Agent, or Firm*—Howard D. Doescher

[57] ABSTRACT

The production of microfibrous carbon by the catalytic pyrolysis of carbonaceous materials in the presence of metal containing catalysts is improved by the presence of a small quantity of a phosphorus-containing substance.

17 Claims, No Drawings

CATALYTIC FIBROUS CARBON

This application is a divisional application of our copending patent application Ser. No. 343,642, filed Jan. 28, 1982, abandoned.

BACKGROUND OF THE INVENTION

The catalytic pyrolysis of carbonaceous materials to produce carbon particles is well known. Many metal catalysts have been suggested for use in pyrolysis reactions. Group VIII metals, such as iron, cobalt, and nickel, are among the metals used.

THE INVENTION

It has been discovered that in the production of microfibrous carbon the action of the catalyst can be improved by the addition of a Group V element-containing substance.

OBJECTS OF THE INVENTION

It is an object of the invention to produce carbon fibers having high surface areas from oganic compounds at elevated temperatures.

It is another object of the invention to enhance the effectiveness of Group VIII metal catalysts in carbon fiber production by employing suitable quantities of one or more Group V substances.

It is another object of the invention to produce high surface area microfibrous carbon fibers using a catalyst combination containing a Group VIII metal oxide and phosphorus.

It is still another object of the invention to produce high surface area carbon fibers using a three component catalyst containing a Group VIII metal oxide, a Group III or IV metal oxide, and phosphorus.

DESCRIPTION OF THE INVENTION

The Carbon Containing Substance

Useful carbon sources or carbonaceous materials are organic compounds and oxides of carbon. The preferred organic compounds are hydrocarbons such as alkanes, alkenes, and alkynes, with butane, butadiene, and acetylene most preferred. The preferred oxide is carbon monoxide.

Mixtures of hydrocarbons, such as natural gas, can be employed as the carbon source.

In one embodiment of the invention, a hydrocarbon carbon source is diluted with a suitable quantity of inert gas, such as hydrogen or nitrogen. Useful dilution ratios include 0.5:1 to 15:1.

The Group VIII Metal Containing Substance

Useful Group VIII metal substances are free metals, and oxides or salts of these metals. Oxides are most preferred. Of the Group VIII metals—that is of metals having atomic numbers 26–28, 44–46, and 76–78—iron, cobalt, and nickel are preferred. Nickel is most preferred.

Mixtures of Group VIII metal containing substances can be used in the invention.

The concentration of Group VIII metal-containing substance used can vary from 1 to 100%. Preferably it will be 25–50%, based on total catalyst weight.

The Group III or IV Metal-Containing Substance

Of the Group III and IV elements, that is Group IIIa, IIIb, IVa, and IVb, those of Group IVb are preferred. Titanium and zirconium are favored. Titanium is most preferred.

Useful substances containing these metals are the free metals, their oxides, and their salts. Oxides are preferred.

Mixtures of metals from one or more of Group III and IV can be used in the invention. Normally, the concentration of Group III or IV metal-containing substance is between 0–99% based on the total weight of the catalyst, with 31% preferred.

One or more inert refractory materials can be substituted for all or part of the Group III or IV metal containing substances.

The Group V Element Containing Substance

Substances of both Group Va and Vb are contemplated for use. Of these, Group Va substances are preferred. Phosphorus and its compounds are most preferred.

The Group V substance can be an element, an oxide, or a salt. Phosphorus oxides, e.g., phosphates are highly preferred. Mixtures of Group V substances can be used.

The quantity of Group V metal substance employed will be between 0 and 10%, based on the total weight of catalyst, with 1–6% preferred.

Catalyst Preparation

In one embodiment, the catalyst composition of the invention is produced by the steps of:

(1) contacting a Group VIII metal containing substance with a Group III or IV metal containing substance;

(2) contacting the product of step (1) with a Group V element containing substance; and (3) subjecting the product of step (2) to physical treatment such that a solid catalyst is produced.

Alternatively, steps (1) and (2) can be conducted simultaneously.

In another embodiment, the Group VIII metal containing substance is contacted with an inert support material and the resultant product is treated with a Group V element containing substance.

Step (3) will preferably comprise conventional operations, such as filtering, drying, and calcining.

While it is believed that the catalyst is operable in any physical form, it is preferred that the catalyst be in the form of granules.

If the catalyst is used in particulate or granular form, it is preferred that its particle size range from 10 to 300 mesh, preferably 50–100 mesh.

Reaction Conditions

The pyrolysis of the carbon containing substance takes place at elevated temperatures. Since pyrolysis, like destructive distillation, requires the breaking of covalent bonds, energy requirements are large.

The temperatures employed are usually between 500° C. to 1000° C., with preferred temperatures lying between 600° C. and 900° C. Operable pressures are those at which the carbon containing substance is gaseous.

The reaction takes place in any suitable apparatus designed for catalytic pyrolysis and carbon deposition. A non-static apparatus is preferred.

Typically, the carbon source is introduced at a GHSV of 1000 hr$^{-1}$ to 7200 hr$^{-1}$, with 3600 hr$^{-1}$ preferred. The "GHSV" (gas hourly space velocity) is the ratio of the gas volume to the catalyst volume per hour. Alternatively, the GHSV can be expressed as V/V/hr, indicating the ratio of gas volume to catalyst volume to unit time.

The Carbon Product

The carbon particles produced in accordance with the invention are smaller than conventional carbon fibers, i.e., those produced without a Group V element containing substance in the catalyst. Carbon particles produced in accordance with the invention have decreased average fiber diameters and average fiber lengths. The particles of the invention have average surface areas which are three to four times greater than those of conventional carbon particles. It is believed that the increased surface area of the product gives it good binding strength for reinforcement applications.

While generally fibrous in microstructure, the carbon particles produced in accordance with the invention can be characterized in bulk as granular or nodular. Their principal feature is their uniquely high surface area which ranges from 150 to 200 $m^2/g$.

EXAMPLE I

(Production of Catalyst)

About 2.6 moles of KOH (85%) was dissolved in 400 ml of water. 1.3 moles of flame-hydrolyzed $TiO_2$ was slurried in 600 ml of water and the pH of the slurry was adjusted to 8 by adding a few drops of KOH solution. 1.3 moles of Ni $(NO_3)_2 \times 6H_2O$ was dissolved in 1300 ml of water. A portion of the unused KOH solution and all of the Ni $(NO_3)_2$ solution were added simultaneously to the $TiO_2$ slurry at rates which maintained the pH at 8. The remaining KOH was added to raise the pH to 9.0 (i.e. an OH/Ni molar ratio of 2). The resultant precipitate is filtered and washed to a K level equal to 0.1%.

After filtration 1.9 grams of $H_3PO_4$ is added to one ¼ of the solid to give 1.0% phosphorus in the final product. Enough water is added to slurry the gel to a thick slurry. The mixture is dried at 110° C. over night and calcined for 3 hours at 800° C. The granular product is $NiTiO_3$ containing 1.0% phosphorus and is 20/40 mesh in size. Its composition, in calculated weight percentages is: 37.6% Ni, 30.7% Ti, 30.7% O, 1.0% P, and 0.1% K.

EXAMPLE II

(Production of Carbon)

230.2 mg. of a 40/50 mesh $NiTiO_3$ catalyst containing 1% phosphorus (analysis for P showed 1.2%) was used in a TGA (thermal gravimetric analysis apparatus) to produce carbon particles. The carbon source was butane diluted at a 1:10 volume ratio with nitrogen gas. The butane/nitrogen mixture was supplied to the catalyst at a range of 0.0012 moles/min. (30 cc/min) at a temperature of 600° C. Rapid carbon growth (15.3 mg/min) took place until 600 mg had been deposited and breakout occurred. "Breakout" is the point at which further carbon deposits can no longer be weighed using the microbalance of a TGA apparatus. Prior to breakout, the rate of carbon growth accelerated from 12.8 mg/min for 0–100 mg carbon to 17.2 mg/min for 400–500 mg. 5.7 grams of carbon was formed. The final carbon to catalyst ratio was 24.8 The carbon particles had a surface area of 179 $m^2/g$.

EXAMPLE III

(Use of catalysts having varying P content)

Five runs were conducted with $NiTiO_3$ catalysts containing varying amounts of added phosphorus. Butane diluted with inert gas was passed over the catalysts at 600° C. and atmosphere pressure.

| Run No. | Phosphorus Weight % | Carbon Surface Area ($m^2/g$) | Fiber Diameter[a] ($10^{-6}$ m) | Fiber Length[a] ($10^{-6}$ m) |
|---|---|---|---|---|
| 1 | 0 | 54 | 0.06 | 2 |
| 2 | 0.2 | 55 | b | — |
| 3 | 1.2 | 179 | c | — |
| 4 | 3.0 | 178 | 0.045 | 0.6 |
| 5 | 5.6 | 181 | 0.023 | 0.4 |

[a] measured by transmission electron microscopy
[b] observed by scanning electronic microscopy, insufficient resolution for accurate measurement, but appears close to run #1 in dimensions.
[c] observed by scanning electronic microscopy, insufficient resolution for accurate measurement, but appear close to runs 4 and 5 in dimensions.

As the above table indicates, an increase in phosphorus concentration produces a decrease in the diameter and the length of the carbon fibers produced. Correspondingly, as the phosphorus concentration increases, the surface area of the carbon product increases.

Reasonable variations and modifications which will become apparent to those skilled in the art can be made in the present invention without departing from the spirit and scope thereof.

We claim:
1. A process of producing microfibrous carbon comprising pyrolyzing a carbon containing substance in the presence of a catalyst comprising:
    (a) an iron Group VIII metal containing substance, selected from iron, cobalt and nickel,
    (b) a Group IVb metal containing substance, and
    (c) a Group Va element containing substance.
2. The process of claim 1 wherein (a) and (b) are oxides and (c) is selected from substances containing phosphorus or arsenic.
3. The process of claim 2 wherein (c) is phosphorus.
4. The process of claims 2 wherein (a) is at least one oxide selected from the oxides of iron, cobalt, and nickel, and (b) is at least one oxide selected from oxides of titanium and zirconium.
5. The process of claim 3 wherein (a) is nickel oxide, and (b) is titanium oxide.
6. The process of claim 5 wherein the carbon containing substance is at least one substance selected from alkanes and alkenes.
7. The process of claim 5 wherein the carbon containing substance is an alkane.
8. The process of claim 5 wherein the carbon containing substance is butane.
9. In a process of pyrolyzing carbon containing substances in the presence of a catalyst containing iron group metal selected from iron, cobalt and nickel and group IVb metal to produce microfibrous carbon, the improvement wherein from 0.001 to 20% by weight based on the weight of the total catalyst composition of a Group Va element containing additive is employed to increase the surface area of the carbon product.
10. The process of claim 9 wherein the additive is elemental phosphorus or a compound of phosphorus.
11. The process of claim 10 wherein the amount of additive employed ranges from 0.01 to 10 weight per- cent based on the weight of the total catalyst composition.

12. The process of claim 11 wherein the additive is elemental phosphorus.

13. The process of claim 9 wherein the catalyst is nickel oxide and titanium oxide.

14. The process of claim 9 wherein the catalyst contains nickel oxide, titanium oxide, and phosphorous.

15. The process of claim 9 wherein the carbon containing substance is at least one substance selected from alkanes and alkenes.

16. The process of claim 9 wherein the carbon containing substance is an alkane.

17. The process of claim 9 wherein the carbon containing substance is butane.

* * * * *